June 7, 1966  P. L. MICHAEL  3,254,528
TRANSDUCER MOUNT

Filed Nov. 23, 1962

INVENTOR
PAUL LEE MICHAEL

BY  *Rupert J. Brady*
ATTORNEY

INVENTOR
PAUL LEE MICHAEL

BY *Rupert J. Brady*
ATTORNEY

United States Patent Office 3,254,528
Patented June 7, 1966

3,254,528
TRANSDUCER MOUNT
Paul L. Michael, 667 Franklin St., State College, Pa.
Filed Nov. 23, 1962, Ser. No. 239,554
2 Claims. (Cl. 73—71.4)

The present invention relates to a transducer mount for instruments for indicating the intensity of sonic vibrations, and more particularly to a mount for connecting to a valve or the like a transducer connected to apparatus for determining the quantity of a fluid that is leaking through the valve.

In a water distribution system, for example, leakage of water through a gate valve is a problem. Sometimes it is necessary to know the quantity of water leaking through the valve. This has been very difficult to measure accurately, especially if the valve is not very accessible. Also, measuring the quantity of a fluid flowing through other types of valves is a problem. For example, it may be desirable to know the quantity of fuel that is leaking through an oil valve.

Therefore, it is an object of the present invention to provide a mount for the transducer of an instrument for accurately measuring the quantity of a fluid leaking from an object such as a valve which rigidly connects the transducer to the valve such that the transducer receives accurate vibrations therefrom.

Still another object is to provide a vibration pick-up mount for an instrument for measuring the quantity of water that is leaking through an underground gate valve, the mount being very easy to use and capable of providing efficient coupling with the leaking valve without expensive and time consuming excavation and disassembly.

Still another object is to provide such a pick-up mount that is compact, light in weight, easy to manipulated and economical to manufacture.

Another object is to provide a transducer that has a base which is adapted to be rigidly and quickly fastened to the object or to a rigid coupling to the object with a minimum of effort for efficiently transferring the filtered vibrations from the object to the transducer.

In accordance with the invention, the foregoing objects are achieved by a sonic vibration transducer which is adapted to filter certain sonic vibration frequencies and which has special means for attaching the transducer to a gate valve wrench or other object. A measuring instrument connected with the transducer mounted on the gate valve contains: an electronic filter, attenuator, amplifier and meter, for responding to electrical waves from the transducer output to accurately measure and indicate the intensity of the vibrations picked up from the gate valve, therefore, the quantity of fluid that is leaking through the valve.

In one embodiment of the invention, a magnet holds the transducer to the gate valve wrench or other object, or to a rigid extension therefrom. In another embodiment, a mechanical clamping means is employed.

Achievement of the foregoing objects as well as other objects and advantages of the present invention will become more apparent from the following detailed description of the accompanying drawings wherein.

Figure 1:
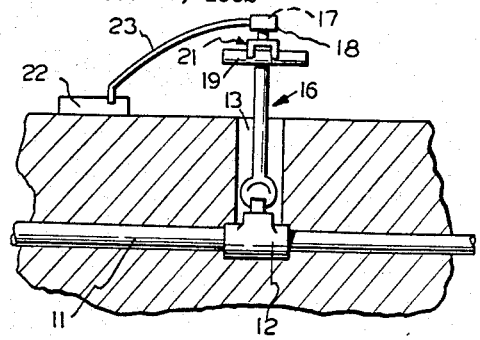
FIG. 1 is a view, which is partly schematic, for showing apparatus for measuring the quantity of a fluid leaking from a gate valve of an underground pipe.

Referring to FIG. 1, a water pipe 11 of a water distribution system, not shown, is buried underground. A gate valve 12 closes or modifies the passage of water through the pipe. A hole 13 in the ground permits a T-shaped gate valve wrench 16 to be attached to the valve 12 for adjusting the flow of water through the valve.

A transducer indicated at 17 converts mechanical vibrations received thereby into electrical waves. A mount or housing 18 having transducer 17 therein is affixed to an attaching means 21 for securing the transducer to the handle 19 of the valve wrench 16. The transducer 17 is a modified version of the Shure 61B accelerometer or a modified Hall-Sears geophone (velocity type), for example. The active element of the Shure accelerometer is a tripod mounted bimorph crystal with the free corner loaded with the proper mass to set its resonant frequency at the desired point. The active element of the Hall-Sears geophone is a conventional spring mounted inertial geophone loaded in a similar manner to obtain the desired resonant frequency and filtering range. It is to be understood that other types of transducers capable of producing electrical signals indicative of the mechanical vibration frequency received can be used without departing from the scope of the invention.

An electrical cable 23 connects the transducer 17 to the input of a measuring instrument 22. The instrument 22 measures and indicates the intensity of the electrical signal output from the transducer 17.

In operation of the system shown in FIG. 1, if water passes through or leaks from the gate valve 12, a sonic vibration signal is produced in the valve and pipe. These vibrations are transmitted to the transducer 17 by the gate valve wrench 16 and the attaching means 21 of the invention. The transducer 17 is designed as a mechanical filter to provide a maximum transmission efficiency at the frequencies of the sonic vibrations where water leakage signal is at a maximum. Background vibrations caused by other vibration sources are not efficiently transmitted by transducer 17. The electrical output of transducer 17 which is indicative of the sonic vibrations received by the transducer from the leaking fluid is supplied to the measuring instrument 22 by a cable 23.

In the measuring instrument 22, the electrical signal from transducer 17 is filtered, amplified, metered, and indicated to determine the quantity of water passing through valve 12. Provision is also made to attach an earphone to the output of the measuring instrument for personal monitoring. The circuit details of the instrument 22 are shown in FIG. 7.

Figure 7:
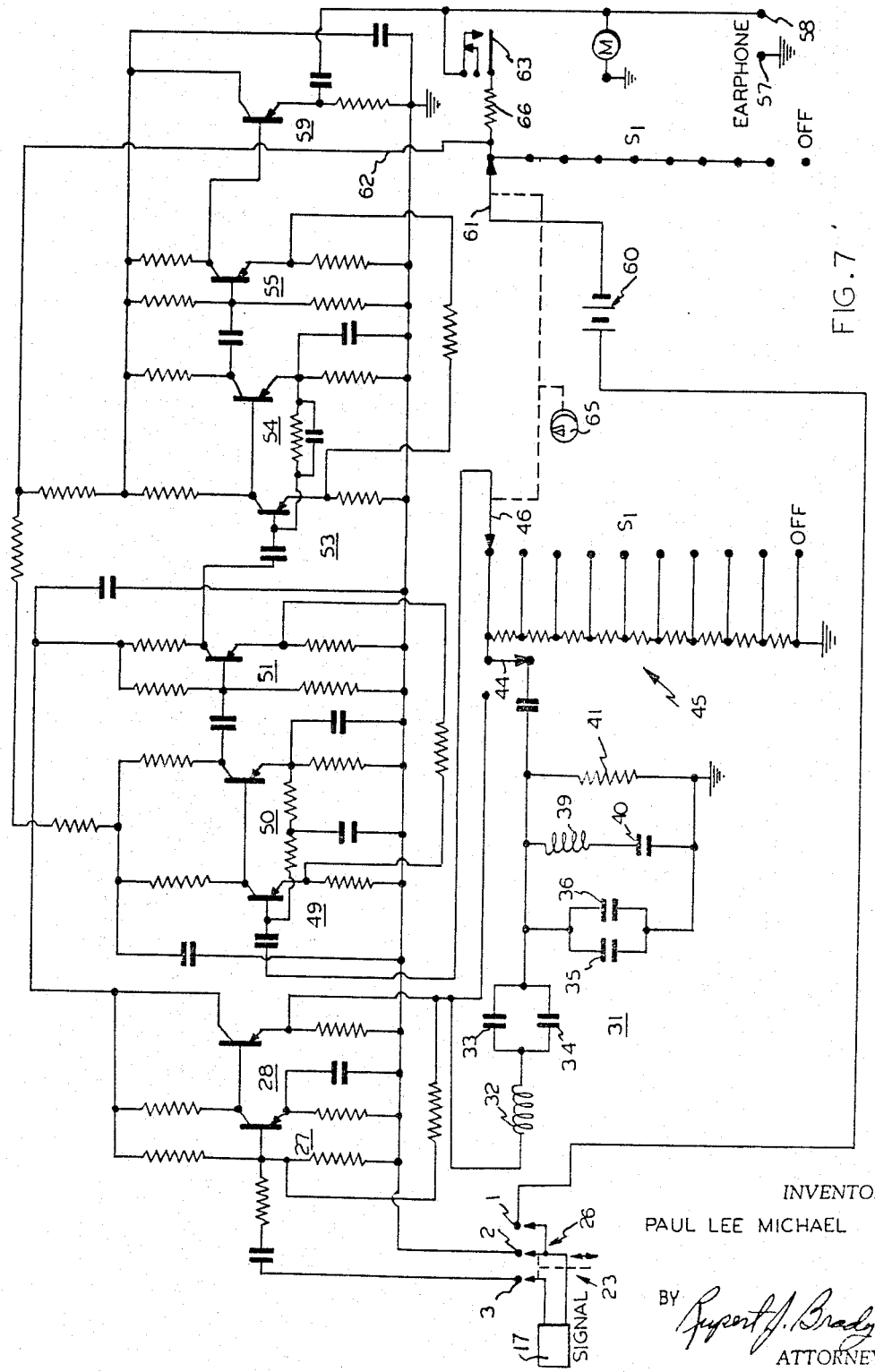
FIG. 7 is a schematic diagram of the measuring instrument.

Referring now to FIG. 7, the transducer signal is applied to input terminals 2 and 3 of the measuring instrument 22 by a connector referred to generally by 26. This connector is adapted to connect terminals 2 and 3 to the terminals of the transducer cable 23 at the moment the cable is inserted into an input receptacle on the panel of the instrument, not shown. At this moment, terminals 1 and 2 are connected for completing the battery power supply circuit for the measuring instrument. The face cover of the instrument will not close with the connector 26 inserted so this method of connecting the battery circuit is used as a safety precaution to prevent the battery power from being left on inadvertently if the main power switch $S_1$ is not turned off.

The transducer signal, at terminals 2 and 3, is supplied to the input of an impedance matching circuit comprising transistors 27 and 28. The transistor circuit has a relatively high input impedance of approximately 100 kilohms, for example, and is connected directly to the cable 23. The transistor 28 serves as an emitter follower for providing a low impedance output for the front end of an electronic filter network 31.

The filter network 31 is composed of an inductor 32 in series with parallel connected capacitors 33 and 34, a shunt network of parallel connected capacitors 35 and 36, another shunt network of an inductor 39 in series with capacitor 40, and a shunt resistor 41. The circuit values of the filter elements are chosen for passing frequencies over a band from 300 to approximately 2500 cycles per second while the mechanical filter of the transducer is designed to pass frequencies over approximately this same band. Leakage of water through gate valve 12 produces sonic vibrations within this frequency band. Background noises having frequencies outside of this band are attenuated. The electrical filter network 31 has the desired cutoff characteristics for optimum performance of the instrument in the desired frequency range and functions best in its location between the input impedance matching circuit 27, 28 and the first amplification stage 49, 50, 51. The mechanical filter of the transducer placed in front of the impedance matching circuit serves to prevent a high-level, broad-band signal that would be produced by conventional transducers at times, from overloading the input circuit. Also any undesired minor passbands of the electrical filter 31 located at frequencies outside the passband of interest would be reduced considerably by the mechanical filter. In one particular design of the filter network 31, the elements have the following circuit values:

| | |
|---|---|
| Inductor 32 | 1 henry. |
| Capacitor 33 | .047 microfarad. |
| Capacitor 34 | .0047 microfarad. |
| Capacitor 35 | 5600 picofarads. |
| Capacitor 36 | 820 picofarads. |
| Inductor 39 | 8 henries. |
| Capacitor 40 | .22 microfarad. |
| Resistor 41 | 22 kilohms. |

A switch 44 selectively connects the input of a first amplifier stage either to the output or to the input of the filter network 31. The switch 44 is connected to the filter output, as is shown in the drawings, at a moment when it is desired to measure leakage of a fluid from a valve in heavily travelled noisy locations, for example. In quiet locations, maximum possible sensitivity at all frequencies is desirable, and the switch 44 is connected to the input of filter network 31, thereby supplying the output of transistor circuit 28 directly to the input of the first amplifier stage.

An attenuator 45 is connected between the switch 44 and the input to the first amplifier stage. The attenuator is composed of a resistance voltage divider which has ten spaced terminals for contact with a movable attenuator selector switch 46. The values of the resistances between the voltage divider terminals are chosen in accordance with circuit design requirements. In one design for the attenuator 45, the resistances are selected for logarithmic 10 decibel steps. Each attenuator step is marked on the face panel of the instrument as 0, 10, 20, 30, etc., starting from the lowest attenuation point so that the number indicated plus the reading on a logarithmic output meter can be used as the output level. This arrangement, using a logarithmic scale, makes it possible to cover an extremely wide output range conveniently. The last attenuator step following the highest attenuator induction is grounded and connected to an "off" terminal. This arrangement of the power switch requires that the power is initially applied when the highest attenuation is in the circuit, thus preventing overloading and possible damage to the instrument.

The first amplifier stage is composed of transistor circuits 49, 50 and 51. The output of the first amplifier stage is capacitively coupled to the input of a second amplifier stage. The second stage is composed of transistor circuits 53, 54 and 55. A transistor emitter follower circuit 59 matches the output of the second amplifier stage to the meter M. Earphones are connected to terminals 57 and 58 if it is desired to detect an audible indication of the intensity of the input supplied to the measuring instrument.

A battery 60 supplies power to the instrument. The positive terminal of the battery is connected to terminal 1. The negative terminal of the battery 60 is connected to the transistor circuits by a switch 61 and a connection 62. The switch 61 is ganged with switch 46 and moves between ten terminals that correspond to the ten terminals along the attenuator 45. Of the terminals engaged by switch 61, nine terminals are interconnected so that power is supplied to the circuit in these positions the tenth terminal is open. The tenth terminal is an "off" terminal for disconnecting battery 60 from the transistor circuits. The switches 61 and 46 are part of a two stage rotary switch $S_1$. The rotary switch $S_1$ is controlled by an adjustable knob 65 for changing the sensitivity of the measuring instrument.

A switch 63 is provided for checking the battery 60. This is a push button switch that is normally biased to open a D.C. connection between one terminal of the meter M and the negative terminal of the battery. The switch 63 completes a D.C. connection to the meter M through a resistor 66 having a large relative valve of resistance. The meter M is adapted to check and indicate whether or not the battery 60 is serviceable. This check is made each time the instrument is used the connector attachment 26 must complete the D.C. battery circuit to make the check.

In one actual embodiment of the instrument shown in FIG. 7, all of the transistors are type 2N321, except transistor 49. Transistor 49 is type 2N175. The values of the components used with the various transistors and the connection of the circuit components used therewith are determined by conventional design techniques, and are unnecessary to describe.

In operation of the measuring instrument shown in FIG. 7, the meter M indicates the level of the output from the transducer 17. By employing calibration curves, the leakage rate of a fluid from any valve or other object to which the instrument is attached is readily ascertained at any fluid pressure. It has been found that leakage rates can be determined very accurately in a range from less than one gallon per hour to above 2000 gallons per hour, and the meter M can be calibrated directly in gallons per hour.

To ensure that vibrations are efficiently transmitted to the transducer 17 from a valve or other object, the transducer attaching means 21 of the invention must clamp the transducer securely to the valve 16 or any other extension from the point of measurement of sonic vibrations. Two attaching means embodiments are illustrated, one in FIG. 2 and 3, the other in FIGS. 4–6.

Figure 2:
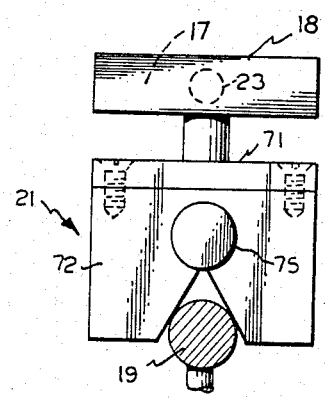
FIG. 2 is an end view of the transducer mount and means for attaching the transducer to a gate valve wrench in accordance with one embodiment of the invention.
Figure 3:
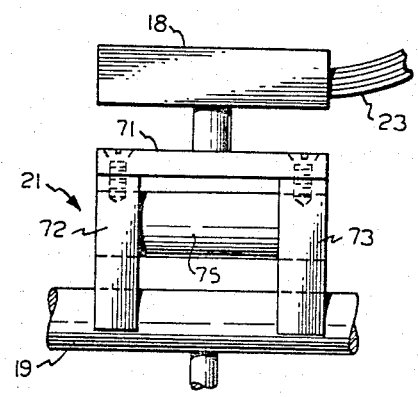
FIG. 3 is a side view of the construction shown in FIG. 2.

Referring to FIGS. 2 and 3, the transducer housing 18 is screwed firmly to a generally recangular mounting base plate 71 of the attaching means 21. A strong magnet composed of first and second end member of ferrous material or pole pieces 72 and 73 and a bar magnet 75 extending between the pole pieces, is screwed firmly to the mounting base plate 71. V-shaped slots in the sides of the magnet or in the lower terminating edges of the end members 22 and 73 are provided for receiving the generally circular cross-section handle 19 of valve wrench 16 to quickly and firmly secure the transducer 17 to the gate valve or other object. In one embodiment of the invention for measuring a water leak through a gate valve, the base plate 71 is ⅜″ thick and the magnet is about 2″ x 2″ x 2″.

Figure 4:
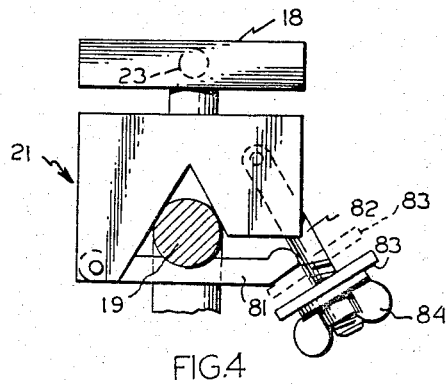
FIG. 4 is an end view of the transducer mount and attaching means in accordance with a second embodiment of the invention.
Figure 5:
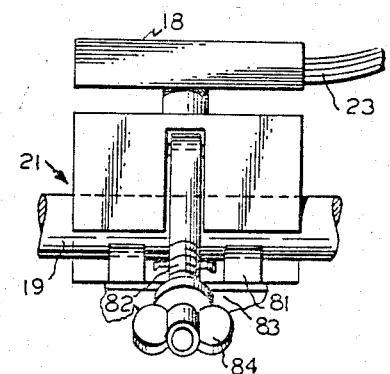
FIG. 5 is a side view of the construction shown in FIG. 4.
Figure 6:
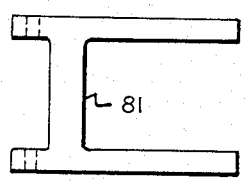
FIG. 6 is a top view of the hinged clamp shown in FIGS. 4 and 5.

In the event that the transducer 17 is required to be mounted upon a valve wrench or other object that is not made from ferrous material, attaching means 21 is constructed as is shown in FIGS. 4–6.

In FIGS. 4–6, the attaching means 21 has a top wall to which the housing 18, which contains the transducer, is firmly screwed. It has two end walls and an under surface which has an upwardly extending V-shaped slot extending longitudinally thereof for receiving and engaging the upper side of the handle 19 of the valve wrench 16. An H shaped member 81 is hinged upon the lower edge of the attaching means adjacent the end walls, and is adapted to be swung against the lower side of the valve wrench handle.

The H-shaped member 81 is clamped upon the valve wrench handle by a rod 82 that is hinged at an intermediate point between the end walls of the attaching means 21 as is shown in FIG. 5. The rod 82 is threaded at one end for receiving a locking plate 83 and a winged nut 84 for rigidly clamping the base 21 to the valve wrench handle by lockingly engaging the ends of the H-shaped clamp member. The H-shaped member is thus adapted to be pivoted beneath the handle 19 and locked in a position straddling the upstanding valve wrench portion.

Preferred embodiments of the invention have been described and illustrated. Obviously changes can be made in the embodiments and different words of description might be used without departing from the scope and spirit of the invention. Therefore, it is understood that the invention is limited solely by the scope of the accompanying claims.

What is claimed is:

1. A device for connecting a transducer to the handle of a gate valve wrench of the type having a circular cross-section handle portion connected at right angles to the top of the upstanding valve wrench comprising, a generally rectangular base member, a housing connected to said base member, transducer means connected within said housing, a pair of end members of ferrous material connected to opposite ends of said base member and depending therebeneath, a magnet connected between said pair of end members, and said pair of end members having lower terminating edges having V-shaped slots therein for receiving the handle portion of the gate valve wrench for magnetic attachment thereto whereby vibrations in the valve wrench are transmitted directly to the transmitted directly to the transducer.

2. A device for connecting a transducer to a gate valve wrench of the type having a generally circular cross-section handle portion connected at right angles to the top of an upstanding valve wrench portion comprising, a base portion, a housing connected centrally of said base portion, transducer means connected in said housing, an upwardly extending V-shaped slot on the under surface of said base portion and extending longitudinally thereof, an H-shaped clamp member pivotally connected to one lower edge of said base portion, a locking member pivotally connected to said base portion opposite the pivotal connection of said H-shaped clamp member and adapted to lockingly engage the ends of said H-shaped clamp opposite its pivotal connection, whereby the handle portion of the valve wrench is adapted to be received in the V-shaped slot and the H-shaped clamp pivoted beneath the handle and locked in position straddling the upstanding valve wrench portion by said locking member to retain the handle therein and rigidly connect the transducer directly above the upstanding valve wrench portion.

References Cited by the Examiner

UNITED STATES PATENTS

| 267,825 | 11/1882 | Bell | 73—40.5 |
| 2,008,934 | 7/1935 | Smith | 73—40.5 |
| 2,645,938 | 7/1953 | Billstein | 73—67.8 X |
| 2,873,604 | 2/1959 | Samsel | 73—67.1 |
| 2,876,638 | 3/1959 | Diamond | 73—67.2 |
| 3,170,152 | 2/1965 | Long | 73—40 X |

FOREIGN PATENTS

| 464,637 | 4/1950 | Canada. |
| 1,061,773 | 12/1953 | France. |

RICHARD C. QUEISSER, *Primary Examiner.*

JOHN P. BEAUCHAMP, *Examiner.*